United States Patent [19]

Mueller

[11] 4,302,839
[45] Nov. 24, 1981

[54] MULTIPLEX UNIT WITH MEANS FOR RESPONDING TO SIGNAL LOSS IN ONE OR MORE CHANNELS

[75] Inventor: Horst Mueller, Hohenschaeftlarn, Fed. Rep. of Germany

[73] Assignee: Siemens Aktiengesellschaft, Berlin & Munich, Fed. Rep. of Germany

[21] Appl. No.: 82,696

[22] Filed: Oct. 9, 1979

[30] Foreign Application Priority Data

Oct. 27, 1978 [DE] Fed. Rep. of Germany ....... 2846960

[51] Int. Cl.³ ............................ H04J 3/07; H04J 3/14
[52] U.S. Cl. ..................................... 370/102; 370/13; 370/55
[58] Field of Search ...................... 370/55, 102, 13, 14

[56] References Cited

U.S. PATENT DOCUMENTS

| | | | |
|---|---|---|---|
| 3,985,963 | 10/1976 | Boutmy | 370/55 |
| 4,017,688 | 4/1977 | Callens | 370/55 |
| 4,060,698 | 11/1977 | Birnie | 370/102 |
| 4,105,869 | 8/1978 | Aveneau | 370/55 |
| 4,107,469 | 8/1978 | Jenkins | 370/55 |

OTHER PUBLICATIONS

*The Post Office Electrical Engineer's Journal;* Jul. 1976; "Multiplexing for A Digital Main Network" by Brigham et al.; pp. 93–102.

*Primary Examiner*—David L. Stewart
*Attorney, Agent, or Firm*—Hill, Van Santen, Steadman, Chiara & Simpson

[57] ABSTRACT

A multiplex unit for multiplexing plesiochronous digital signals has a monitoring device for signalling the loss of input signals on one or more channels being multiplexed. Upon recognition of a lost signal in one or more channels, an alarm indication signal is substituted for the information signals in that channel and a synthetic justification signal is produced which replaces the justification information in such channel. The synthetic justification information gives the alarm indication signal the correct pulse repetition rate in the outgoing channel of the multiplex unit.

6 Claims, 5 Drawing Figures

FIG 4

| RT | A6 | A5 | A4 | A3 | A2 | A1 | A7 |
|----|----|----|----|----|----|----|----|
| 1  | 0 | 0 | 0 | 0 | 0 | 0 | 1 |
| 2  | 0 | 0 | 0 | 0 | 0 | 1 | 0 |
| 3  | 0 | 0 | 0 | 0 | 1 | 0 | 1 |
| 4  | 0 | 0 | 0 | 0 | 1 | 1 | 0 |
| 5  | 0 | 0 | 0 | 1 | 0 | 0 | 1 |
| 6  | 0 | 0 | 0 | 1 | 1 | 0 | 0 |
| 7  | 0 | 0 | 0 | 1 | 1 | 1 | 1 |
| 8  | 0 | 0 | 0 | 1 | 1 | 0 | 0 |
| 9  | 0 | 0 | 1 | 0 | 0 | 0 | 1 |
| 10 | 0 | 0 | 1 | 1 | 0 | 1 | 1 |
| 11 | 0 | 0 | 1 | 1 | 0 | 1 | 0 |
| 12 | 0 | 0 | 1 | 1 | 0 | 1 | 1 |
| 13 | 0 | 0 | 1 | 1 | 1 | 0 | 0 |
| 14 | 0 | 0 | 1 | 1 | 1 | 0 | 1 |
| 15 | 0 | 0 | 1 | 1 | 1 | 1 | 0 |
| 16 | 0 | 0 | 1 | 1 | 1 | 1 | 1 |
| 17 | 0 | 1 | 0 | 0 | 0 | 0 | 1 |
| 18 | 0 | 1 | 0 | 0 | 0 | 1 | 0 |
| 19 | 0 | 1 | 0 | 0 | 1 | 0 | 1 |
| 20 | 0 | 1 | 0 | 0 | 1 | 1 | 0 |
| 21 | 0 | 1 | 0 | 0 | 1 | 0 | 1 |
| 22 | 0 | 1 | 0 | 0 | 1 | 0 | 0 |
| 23 | 0 | 1 | 0 | 0 | 1 | 0 | 1 |
| 24 | 0 | 1 | 0 | 1 | 1 | 0 | 0 |
| 25 | 0 | 1 | 1 | 0 | 0 | 0 | 1 |
| 26 | 0 | 1 | 1 | 1 | 0 | 0 | 0 |
| 27 | 0 | 1 | 1 | 1 | 0 | 1 | 1 |
| 28 | 0 | 1 | 1 | 1 | 0 | 1 | 0 |
| 29 | 0 | 1 | 1 | 1 | 1 | 0 | 1 |
| 30 | 0 | 1 | 1 | 1 | 1 | 0 | 0 |
| 31 | 0 | 1 | 1 | 1 | 1 | 0 | 1 |
| 32 | 0 | 1 | 1 | 1 | 1 | 1 | 1 |
| 33 | 1 | 0 | 0 | 0 | 0 | 0 | 1 |

MULTIPLEX UNIT WITH MEANS FOR RESPONDING TO SIGNAL LOSS IN ONE OR MORE CHANNELS

FIELD OF THE INVENTION

The present invention relates to a multiplex unit for plesiochronous signals and especially to a multiplex unit for handling digital signals in time division multiplex format with a positive or negative justification process used in systems with branching connections and having monitoring arrangements for reporting the loss of one or more of the signals being multiplexed.

THE PRIOR ART

In digital transmission systems for the time division multiplex of multiple signal channels, when the signal in one or more channels is lost, or an error in such signal is recognized, an alarm indication signal or AIS signal is generated which is supplied to all downstream units. Typically, the AIS signal is made up of continuous "1's", and such signal is recognized in the downstream units and prevents them from generating an alarm. The pulse repetition rate of the AIS signal should lie within the tolerance limits which are valid for the plesiochronous digital signals.

Plesiochronous digital signals are handled in a time division multiplex unit by a justification process, in which a number of bit positions are provided, during each multiplex frame, to accommodate excess bits arriving in each of the several channels. The frame also carries justification information which identifies the justification bits and distinguishes them from unused justification bit spaces.

In a multiplex system in which four signal channels each carrying signals having a pluse repetition rate of 2.048 megabits per second are merged into one carrying signals with a pulse repetition rate of 8.448 megabits per second, the required frequency tolerance limits for the AIS signal are, for example, 2.048 ($1 \pm 5 \times 10^{-5}$) megabits per second. When an incoming signal at 2.048 megabits per second is lost, the AIS signal must be inserted with a nominal bit sequence frequency into the bit positions of the disrupted channel in the 8.448 megabits per second bit stream. Accordingly, the justification information bits must be placed in such a manner that the pulse repetition rate of the AIS signal lies within the required frequency tolerance so that it can be received and recognized by downstream units.

A multiplex unit for handling plesiochronous signals is described in "The Post Office Electrical Engineers Journal", July, 1976, pages 93-102. In that system, a stand-by clock is provided for generating an AIS signal within the allowable pulse repetition rate, and such signal is fed into the multiplexer at its input side. Such a system is appropriate when the necessary adaptation devices are present, but there are some situations in which special adaptation installations must be provided when such a system is used, for example, in branching connections. It is desirable to provide a system which supplies an AIS signal without requiring special adaptation procedures.

SUMMARY OF THE INVENTION

A principal object of the present invention is to provide a multiplex unit in which handling of the AIS signal can take place without special adaptation installations.

This object is attained in the present invention by providing an arrangement for generating synthetic justification information which triggers an AIS signal within the required tolerance range with a change-over arrangement for accommodating the synthetic justification information which is controlled by a monitoring arrangement and, upon loss of one or more channel signals, feeds the synthetic justification information into the affected channel instead of the incoming justification information for that channel, and also feeds the AIS signal into the multiplexer in place of the lost channel signal.

The present invention achieves the advantage of a relatively low jitter characteristic, since the synthetic justification information is arranged in such a way that there is a practically uniform distribution of "1's" within a sequence of frames.

BRIEF DESCRIPTION OF THE DRAWINGS

Reference will now be made to the accompanying drawings in which:

FIG. 4 is a table illustrating the condition of the outputs of certain units illustrated in FIG. 3.

DESCRIPTION OF THE PREFERRED EMBODIMENT

Figure 1:
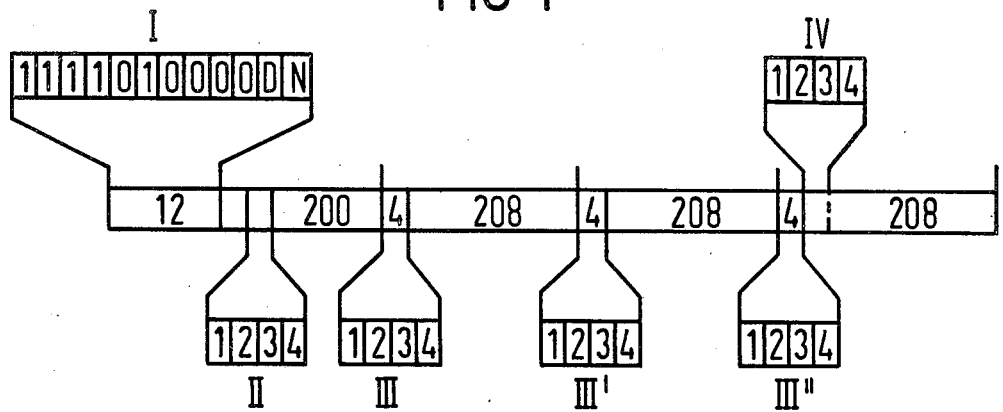
FIG. 1 is a diagrammatic illustration of a frame of a time division multiplex system.

Before describing the apparatus illustrated in the drawings, it is useful to consider the interrelationships between the nominal frequency of an input channel and that of the output channel of the multiplexer, as well as the frame parameters of the multiplex system. The relative filling frequency may be described by the following formula:

$$\delta = (n/m) - (f_u/f^o) \cdot N$$

where $\delta$ is the relative filling frequency, i.e., the ratio of the frequency of the filling locations to the frequency of the maximum possible filling locations; n is the number of information bits (including filler bits) in each frame; m is the number of the incoming channels being interleaved; $f_u$ is the bit sequence frequency of the incoming channels; $f_o$ is the bit sequence frequency of the outgoing channel; and N is the number of bits per frame. In a typical system, merging four input channels having a nominal bit sequence frequency of 2.048 megahertz$\pm 5 \times 10^{-5}$ kilohertz, and a nominal output frequency of 8.448 megahertz$\pm 3 \times 10^{-5}$ kilohertz, N is 848 and n is 824. The nominal filling frequency $\delta$ is then (14/33). This means that justification must be provided fourteen times within thirty-three consecutive frames.

Where the frequency tolerance of the outgoing channel is lower than that of the incoming channels, it is desirable to insert justification information bits not with the nominal relative filling frequency, but rather with a filling frequency which deviates slightly from the nominal.

Referring now to FIG. 1, a diagrammatic illustration is provided of a pulse frame using a positive justification procedure according to the CCITT recommendation G.742, in which four input channels having a pulse repetition rate of 2.048 megabits per second are converted into one with a rate of 8.448 megabits per second. The latter is divided into basic frames of 848 bit times each. In block I, the first ten bits form the frame identification word, the D bit forms a signal bit for an urgent alarm and the N bit forms a signal bit for a non-urgent alarm. Block II shows information bits of the four incoming signal channels. Blocks III, III' and III'' contain parts of the justification information for the four incoming channels. Thirty-three of these blocks form an overframe which contains complete justification information. The bits of Block IV can be used for additional justification bits if they are not required for the transmission of information from the four incoming channels.

Figure 2:
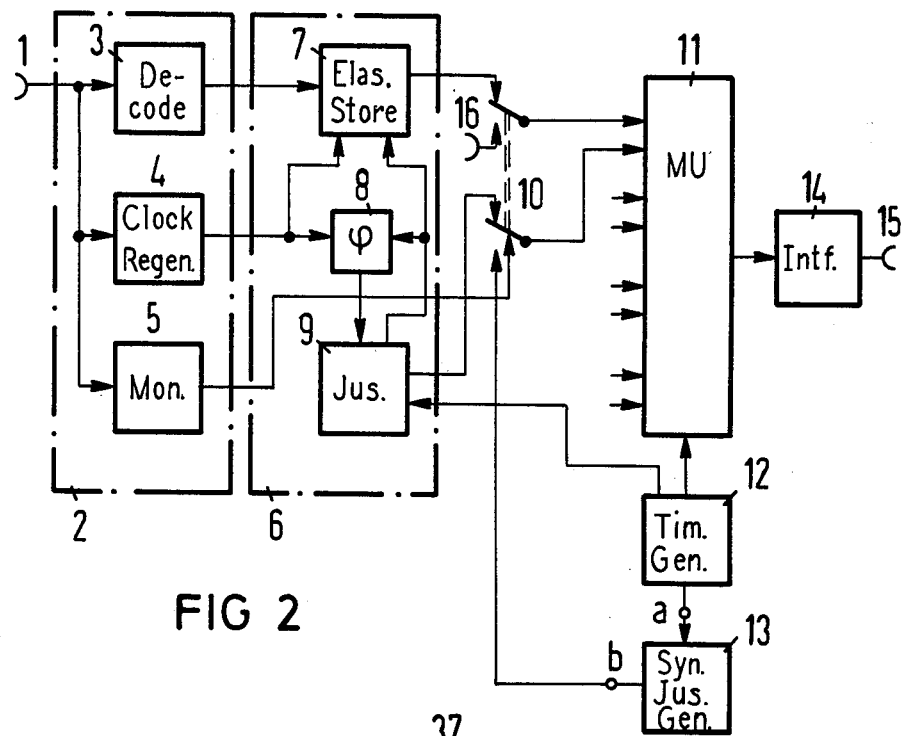
FIG. 2 is a functional block diagram of a multiplex unit incorporating an illustrative embodiment of the present invention.

FIG. 2 shows a functional block diagram of a multiplex system incorporating an illustrative embodiment of the present invention. Only one incoming channel has been illustrated, for the sake of clarity. The input 1 receives an input channel at 2.048 megabits per second, which is connected to an interface 2 containing a decoder 3, a clock regenerator 4, and a monitoring unit 5. The decoder 3 is adapted to decode the incoming code which may be HDB3, into binary, as known in the art. The clock regenerator 4 regenerates a clock signal from the incoming signal applied to the terminal 1, and the monitor unit 5 determines whether the incoming signal has been lost.

Output signals from the units 3, 4 and 5 are connected to an adapter unit 6, which includes an elastic storage unit 7, a phase discriminator 8, and a justification unit 9.

The elastic store unit 7 stores incoming signals decoded by the decoder 3, and employs signals produced by the clock regenerator 4 as write clock pulses.

The justification unit 9 produces read-out clock pulses for the elastic store 7 and the phrase discriminator 8 compares the phases of the read and write pulses, and controls the justification unit 9.

Output signals produced by the elastic store 7 and the justification unit 9 pass through the change-over unit 10 to the inputs of a multiplexer unit 11. The change-over unit 10 is illustrated in FIG. 2 in the form of a double-pole-double-throw switch, and this switch is shown in its normal position, which connects inputs of the multiplexer 11 to the outputs referred to above. These outputs are combined in the multiplexer unit 11, under control of signals from the timing generator 12, which also supplies signals to the justification unit 9. The output of the multiplexer 11 passes through an interface unit 14, and arrives at an output terminal 15 as an 8.448 megabit per second signal.

When the monitoring unit 5 determines the loss of an input signal from the input 1, the position of the change-over switch 10 is changed, so that an AIS signal in the form of continuous "1's" is supplied to the multiplexer 11 from the terminal 16. Also, a signal from the synthetic justification generator 13 is supplied to the other input of the multiplexer 11, instead of the normal output from the justification unit 9. The timing of the synthetic justification generator 13 is controlled by signals from the timing generator 12.

The multiplexer 11 combines the AIS signal from the terminal 16 with the synthetic justification information from the generator 13. The synthetic justification information is generated so as to produce the desired pulse repetition rate in the output signal supplied to the terminal 15.

Figure 3:
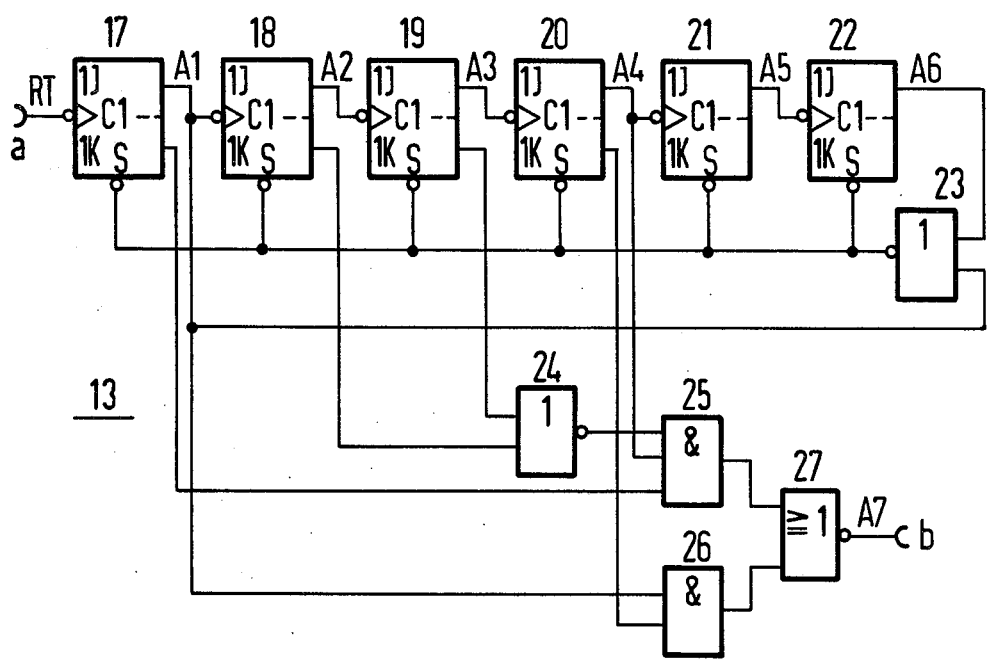
FIG. 3 is a functional block diagram of apparatus for generating synthetic justification information.

FIG. 3 illustrates an arrangement 13 for generating the synthetic justification information. Six JK flip-flops 17–22 are connected in cascade with the non-inverting outputs of the first five flip-flops each connected to the clock input of the succeeding flip-flop. The clock input of the first flip-flop is connected to receive signals, one for each frame, at terminal a from the timing generator 12 (FIG. 2). A NAND-gate 23 has its two inputs connected to the non-inverting outputs A1 and A6 of the first and sixth flip-flops 17 and 22, respectively, and its output is connected to the reset inputs of all six flip-flops. A NAND-gate 24 has its inputs connected to the inverting outputs of flip-flops 18 and 19, and supplies an output signal to an AND-gate 25. The other two inputs of the AND-gate 25 are connected to the non-inverting output A4 of the flip-flop 20, and the inverting output of the flip-flop 17, and its output is connected as an input to a NOR-gate 27. The other input of the NOR-gate 27 is derived from an AND-gate 26 having its inputs connected to the non-inverting output A1 of the flip-flop 17 and the inverting output of the flip-flop 20. The output of the NOR-gate 27 supplies the synthetic justification signal to terminal b, which is connected as illustrated in FIG. 2 to the change-over switch 10.

FIG. 4 is a chart illustrating the non-inverting outputs A1–A6 of the flip-flops 17–22, and the final output A7 of the NOR-gate 27. The outputs are shown for thirty-three consecutive frames, which are numbered in the column headed "RT". It is apparent from the output signals A7 that there is an approximately uniform distribution of "1's" throughout the over-frame period comprising thirty-three frame times.

Figure 5:
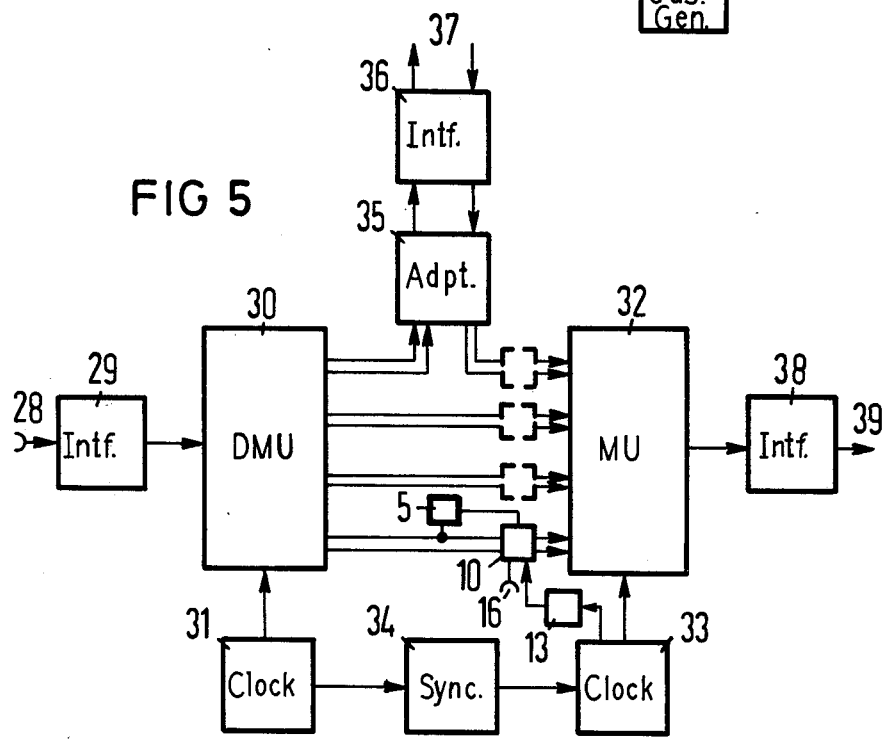
FIG. 5 is a functional block diagram of a multiplex system incorporating a branching connection.

FIG. 5 shows a system including a branching connection incorporating an interface 29 having an input terminal 28 connected to receive the 8.448 megabit per second signal and transmitted to a demultiplexer 30. A source of clock pulses 21 supplies clock pulses to the demultiplexer 30 and a plurality of outputs of the demultiplexer are connected as inputs to a multiplex unit 32, through individual change-over switches 10, one of which is shown in FIG. 5. The output of the multiplexer 32 is passed through an interface unit 38 to supply the 8.448 megabits per second signal to the output line 39.

One of the channels of the demultiplexer 30 is connected to an adapter 35 which supplies one of the channel signals through an interface unit 36 to a terminal connected to lines 37. The terminal is adapted to receive data transmitted by the demultiplexer 30, and data originating with the terminal is passed through the units 36 and 35 to channel inputs of the multiplexer 32.

A synchronization unit 34 receives an input from the clock supply 31 and supplies signals to a clock supply unit 33 which furnishes timing signals to the multiplexer 32 and to the synthetic justification generator 13.

The change-over switch 10 in each channel is controlled by the monitor device 5, only one of which is illustrated in FIG. 5. These components are like their counterpart illustrated in FIG. 2, and function to supply signals from the terminal 16 and signals generated by the synthetic justification generator 13 to the inputs of a channel of the multiplexer 32, as necessary. Because of the synchronizing unit 32, the demultiplexer 30 and the multiplexer 32 operate in synchronism.

It will be appreciated that in the system of FIG. 5, no special adaptation is required for the handling of the AIS signals when the synthetic justification system of the present invention is employed. It will be apparent that various modifications and additions may be made in the apparatus of the present invention without departing from the essential features of novelty thereof, which are intended to be defined and secured by the appended claims.

What is claimed is:

1. In a multiplex unit for interleaving plesiochronous signals in plural channels with justification signals for accommodating variations in the pulse repetition rate of incoming channels, the combination comprising; a monitoring unit for monitoring signals in said channels and for producing a signal in response to the loss of signals in one or more of said channels, means for generating synthetic justification information, means for generating an alarm indication signal, and change-over means responsive to said monitoring unit for inserting said synthetic justification information and said alarm indication signal into the output signal of said multiplex unit in place of signals in said one or more channels.

2. Apparatus according to claim 1, wherein said means for generating synthetic justification information produces synthetic justification signals with a substantially uniform distribution of "1's" over a plurality of consecutive frames of said output signal.

3. Apparatus according to claim 1, in which said synthetic justification signal is repetitive with a period equal to thirty-three frames of said output signal.

4. Apparatus according to claim 3, wherein said means for generating synthetic justification information comprises a set of six flip-flops connected in cascade as a resettable counter, means for supplying as an input to a first of said flip-flops a pulse for each frame of said output signal, a first NAND-gate having a first input connected to the non-inverting output of the sixth flip-flop and a second input connected to the non-inverting output of the first flip-flop, the output of said first NAND-gate being connected to the reset inputs of all six flip-flops, a second NAND-gate having a first input connected to the inverting output of the second flip-flop and a second input connected to the inverting output of the third flip-flop, a first AND-gate having a first input connected to the output of said second NAND-gate and a second input connected to the non-inverting output of the fourth flip-flop and a third input connected to the inverting output of the first flip-flop, a second AND-gate having a first input connected to the non-inverting output of the first flip-flop and a second input connected to the inverting output of the fourth flip-flop, and a NOR-gate having a first input connected to the output of said first AND-gate and a second input connected to the output of said second AND-gate, and having an output connected to said change-over arrangement.

5. Apparatus according to claim 1, including a branch circuit connected with one of said channels between a source of signals in said one channel and said multiplex unit.

6. Apparatus according to claim 5, wherein said monitoring unit is connected between said branch circuit and said multiplex unit to detect the loss of a signal in the channel connected to said multiplexer unit from said branch circuit.

* * * * *